United States Patent [19]
Miles

[11] Patent Number: 6,055,090
[45] Date of Patent: Apr. 25, 2000

[54] INTERFEROMETRIC MODULATION

[75] Inventor: Mark W. Miles, Boston, Mass.

[73] Assignee: Etalon, Inc., Mass.

[21] Appl. No.: 09/238,340

[22] Filed: Jan. 27, 1999

Related U.S. Application Data

[60] Continuation of application No. 08/688,710, Jul. 31, 1996, which is a division of application No. 08/554,630, Nov. 6, 1995, abandoned, which is a continuation-in-part of application No. 08/238,750, May 5, 1994, Pat. No. 5,835,255, which is a continuation-in-part of application No. 08/032,711, Mar. 17, 1993, abandoned, which is a continuation of application No. 07/794,819, Nov. 18, 1991, abandoned, which is a continuation of application No. 07/489,794, Mar. 5, 1990, abandoned, which is a continuation of application No. 07/296,896, Jan. 12, 1989, abandoned, which is a continuation of application No. 07/166,774, Mar. 4, 1988, abandoned, which is a continuation of application No. 06/855,116, Apr. 23, 1986, abandoned.

[51] Int. Cl.$^7$ ........................... G02B 26/00; G02B 27/00; G02B 1/10; G02B 5/28; G09G 3/34

[52] U.S. Cl. ........................... 359/291; 359/579; 359/584; 359/589; 345/84; 345/85

[58] Field of Search ........................... 359/290, 291, 359/584, 579, 578, 589; 345/84, 85

[56] References Cited

U.S. PATENT DOCUMENTS

| | | | |
|---|---|---|---|
| 2,534,846 | 12/1950 | Ambrose et al. | 348/270 |
| 3,439,973 | 4/1969 | Paul et al. | 359/486 |
| 3,443,854 | 5/1969 | Weiss | 359/352 |
| 3,653,741 | 4/1972 | Marks | 359/486 |
| 3,656,836 | 4/1972 | de Cremoux et al. | 359/261 |
| 3,813,265 | 5/1974 | Marks | 427/473 |
| 3,955,880 | 5/1976 | Lierke | 359/291 |
| 4,099,854 | 7/1978 | Decker et al. | 359/278 |
| 4,228,437 | 10/1980 | Shelton | 343/909 |
| 4,377,324 | 3/1983 | Durand et al. | 359/578 |
| 4,389,096 | 6/1983 | Hori et al. | 349/5 |
| 4,403,248 | 9/1983 | Te Velde | 348/755 |
| 4,445,050 | 4/1984 | Marks | 307/145 |
| 4,519,676 | 5/1985 | te Velde | 359/223 |

(List continued on next page.)

FOREIGN PATENT DOCUMENTS

WO95/30924  11/1995  WIPO .

OTHER PUBLICATIONS

Aratani, et al., "Surface micromachined tuneable interferometer array", *Sensors and Actuators*, 1994, pp. 17–23.

"Light Over Matters", Jun. 1993, Circle No. 36.

Miles, Mark, W., "A New Reflective FPD Technology Using Interferometric Modulation", Society for Information Display '97 Digest, Session 7.3.

Newsbreaks, "Quantum–trench devices might operate at terahertz frequencies", Laser Focus World May 1993.

Winton, John M., "A novel way to capture solar energy", Chemical Week, May 15, 1985.

(List continued on next page.)

*Primary Examiner*—Georgia Epps
*Assistant Examiner*—Evelyn A. Lester
*Attorney, Agent, or Firm*—Fish & Richardson P.C.

[57] ABSTRACT

An interferometric modulator (Imod) cavity has a reflector and an induced absorber. A direct view reflective flat panel display may include an array of the modulators. Adjacent spacers of different thicknesses are fabricated on a substrate by a lift-off technique used to pattern the spacers which are deposited separately, each deposition providing a different thickness of spacer. Or a patterned photoresist may be used to allow for an etching process to selectively etch back the thickness of a spacer which was deposited in a single deposition. A full-color static graphical image may be formed of combined patterns of interferometric modulator cavities. Each cavity includes a reflector, and an induced absorber, the induced absorber including a spacer having a thickness that defines a color associated with the cavity.

22 Claims, 7 Drawing Sheets

U.S. PATENT DOCUMENTS

| | | | |
|---|---|---|---|
| 4,531,126 | 7/1985 | Sadones | 342/173 |
| 4,663,083 | 5/1987 | Marks | 252/583 |
| 4,681,403 | 7/1987 | te Velde et al. | 349/41 |
| 4,748,366 | 5/1988 | Taylor | 310/328 |
| 4,786,128 | 11/1988 | Birnbach | 385/8 |
| 4,790,635 | 12/1988 | Apsley | 359/260 |
| 4,982,184 | 1/1991 | Kirkwood | 345/84 |
| 5,022,745 | 6/1991 | Zahowski et al. | 359/847 |
| 5,044,736 | 9/1991 | Jaskie et al. | 359/291 |
| 5,075,796 | 12/1991 | Schildkraut et al. | 359/247 |
| 5,078,479 | 1/1992 | Vuilleumier | 359/290 |
| 5,124,834 | 6/1992 | Cusano et al. | 359/291 |
| 5,153,771 | 10/1992 | Link et al. | 359/286 |
| 5,168,406 | 12/1992 | Nelson | 359/855 |
| 5,231,532 | 7/1993 | Magel et al. | 359/295 |
| 5,233,459 | 8/1993 | Bozler et al. | 359/230 |
| 5,311,360 | 5/1994 | Bloom et al. | 359/572 |
| 5,381,253 | 1/1995 | Sharp et al. | 349/18 |
| 5,401,983 | 3/1995 | Jokerst et al. | 257/82 |
| 5,459,610 | 10/1995 | Bloom et al. | 359/572 |
| 5,497,172 | 3/1996 | Doherty et al. | 345/85 |
| 5,500,635 | 3/1996 | Mott | 340/323 R |
| 5,500,761 | 3/1996 | Goossen et al. | 359/290 |
| 5,579,149 | 11/1996 | Moret et al. | 359/223 |
| 5,619,059 | 4/1997 | Li et al. | 257/431 |
| 5,636,052 | 6/1997 | Arney et al. | 359/291 |
| 5,703,710 | 12/1997 | Brinkman et al. | 359/283 |
| 5,710,656 | 1/1998 | Goosen | 359/291 |
| 5,739,945 | 4/1998 | Tayebati | 359/291 |
| 5,784,190 | 7/1998 | Worley | 359/291 |
| 5,825,528 | 10/1998 | Goosen | 359/291 |

OTHER PUBLICATIONS

Jerman et al., "A Miniature Fabry–Perot Interferometer with a Corrugated Silicon Diaphragm Support", Sensors and Actuators A, vol. 29, p. 151, 1991.

Raley et al., "A Fabry–Perot Microinterferometer for Visible Wavelengths", IEEE Solid–State Sensor and Actuator Workshop, Jun. 1992, Hilton Head, SC.

Aratani, et al., "Process and Design COnsiderations for Surface Micromachined Beams for a Tuneable Interferometer Array in Silicon", Proc. IEEE Microelectromechanical Workshop, Fort Lauderdale, FL, Feb. 7–10, p. 230, 1993.

Walker, et al., "Electron–beam–tunable Interference Filter Spatial Light Modulator", Optics Letters vol. 13, No. 5, p. 345, 1988.

Goosen et al., "Silicon Modulator Based on Mechanically–Active Anti–Reflection Layer with 1Mbit/sec Capability for Fiber–in–the–Loop Applications", IEEE Photonic Technology Letters, Sep. 1994.

Goosen et al., "Possible Display Applications of the Silicon Mechanical Anti–Reflection Switch", Society for Information Display, 1994.

Sperger et al., "High Performance Patterned All–Dielectric Interference Colour Filter for Display Applications", SID Digest 1994.

Conner, "Hybrid Color Display Using Optical Interference Filter Array", SID Digest 1993, pp. 577–580.

Wu, "Design of a Reflective Color LCD Using Optical Interference Reflectors", ASIA Display '95, Oct. 16, pp. 929–931.

Johnson, "Optical Scanners", *Microwave Scanning Antennas*, vol. 1, p. 251 et seq. (1964).

Oliner, "Radiating Elements and Mutual Coupling", *Microwave scanning Antennas*, vol. 2, p. 131 et seq. (1966).

Akasaka, "Three–Dimensional IC Trends", Proceedings of IEEE, vol. 74, No. 12, Dec. 1986, pp. 1703–1714.

Stone, "Radiation and Optics, An Introduction to the Classical Theory", McGraw–Hill, pp. 340–343. (1963).

Gosch, "West Germany Graps the Lead in X–Ray Lithography", *Electronics*, Feb. 5, 1987, pp. 78–80.

Howard, "Nanometer–Scale Fabrication Techniques", *VLSI Electronics: Microstructure Science*, vol. 5, 1982, pp. 145–153, pp. 166–173.

Jackson, "Classical Electrodynamics", John Wiley & Sons Inc., pp. 568–573. (No Date Available).

INTERFEROMETRIC MODULATION

This is a continuation of U.S. patent application Ser. No. 08/688,710 filed Jul. 31, 1996 (now allowed), which is a divisional of U.S. patent application Ser. No. 08/554,630 filed Nov. 6, 1995, now abandoned, which is a continuation-in-part of U.S. patent application Ser. No. 08/238,750, filed on May 5, 1994, now U.S. Pat. No. 5,835,255.

BACKGROUND

This invention relates to visible spectrum (including ultraviolet and infrared) modulator arrays.

The parent application describes two kinds of structures whose impedance, the reciprocal of admittance, can be actively modified so that they can modulate light. One scheme is a deformable cavity whose optical properties can be altered by electrostatic deformation of one of the cavity walls. The composition and thickness of these walls, which consist of layers of dielectric, semiconductor, or metallic films, allows for a variety of modulator designs exhibiting different optical responses to applied voltages.

One such design includes a filter described as a hybrid filter which has a narrow bandpass filter and an induced absorber. When the wall associated with the hybrid filter is brought into contact with a reflector, incident light of a certain range is absorbed. This occurs because the induced absorber matches the impedance of the reflector to that of the incident medium for the range of frequencies passed by the narrow-band filter.

SUMMARY

This invention eliminates the need for the narrow-band filter and provides a much broader absorption range.

The invention modulates light by electrostatically varying the spacing of a cavity comprising two walls, one of which is a reflector and the other is the induced absorber. The cavity is fabricated on an optically smooth substrate, i.e., sufficiently smooth to allow for the manifestation of interference effects.

Thus, in general, in one aspect the invention features an interferometric modulator cavity having a reflector and an induced absorber.

Implementations of the invention may include one or more of the following features. The reflector may include films of metal, dielectric, semiconductor, or a combination of them. The induced absorber may include a sandwich of an absorber between two matching layers. One of the matching layers may reside at the boundary of the absorber with an incident medium and the other matching layer may reside at the boundary of the absorber with the reflector. At least one of the matching layers may include a film of metal. At least one of the matching layers may include a dielectric film, or a semiconducting film, or a combination of at least two of a metal film, a dielectric film, and a semiconducting film. The absorber may include a high loss film such as a metal, or a high loss film such as a semiconductor, or a combination of a metal and semiconducting film. There may also be a substrate which includes a transparent incident medium. The induced absorber and/or the reflector may. reside on the substrate. The substrate may be transparent, in which case it could also act as the incident medium, or opaque. The spacer may be air or some other pliant medium (e.g., liquid or plastic) which would allow the thickness of the gap to be altered.

In general, in another aspect, the invention features a direct view reflective flat panel display comprising an array of interferometric modulators.

Implementations of the invention may include one or more of the following. The array may include sets of the interferometric modulators, the respective sets being arranged to switch between different pairs of reflective states. The array may include a single set of interferometric modulators, the set being arranged to be driven in an analog fashion to reflect any particular color. The brightness of each of the modulators is controlled by pulse width modulation, or by spatial dithering, or by a combination of the two. The array may be sealed by a backplane. The backplane may include a monolithic element. The backplane may be attached. The backplane may support electrodes which modify the electromechanical response of the pixels. Each of the modulators may be actuated by electrostatic forces or by piezoelectric forces or by magnetic forces. The display may be used in a projection system. An optical compensation mechanism may be used to mitigate or eliminate a shift in color with respect to viewing angle or to provide supplemental frontlighting or to mitigate or eliminate a shift in color with respect to viewing angle. The substrate may be an integrated circuit.

In general, in another aspect, the invention features a process for fabricating adjacent spacers of different thicknesses on a substrate in which a lift-off technique is used to pattern the spacers which are deposited separately, each deposition providing a different thickness of spacer. Or a patterned photoresist may be used to allow for an etching process to selectively etch back the thickness of a spacer which was deposited in a single deposition.

In general, in another aspect, the invention features a full-color static graphical image comprising an array of interferometric modulator cavities. Each cavity includes a reflector, and an induced absorber, the induced absorber including a spacer having a thickness that defines a color associated with the cavity.

In general, in another aspect, the invention features a full-color static graphical image comprising separate patterns of spacers or interferometric modulator cavities with spacers, in each pattern the spacer having a thickness which defines a color associated with the pattern which when all patterns are combined produces the image.

Among the advantages of the invention may be one or more of the following. High quality full-color flat panel displays may be made possible by using pixels based on these new cavities. By fabricating a pixel which switches between two colors (for example red and black) then a flat-panel display may be fabricated by combining three sets of these pixels designed to switch between red and black, green and black, and blue and black respectively. The inherent color precludes the need for color filter arrays which are typically required for color LCDs. Additionally reflective displays, which are displays which use ambient light instead of backlighting, are particularly susceptible to pixel inefficiencies. Because the cavities of the invention can use greater than 90% of the incident light, they are excellent candidates for this application. These structures, when driven electrostatically, also exhibit a microelectromechanical hysteresis which can be exploited to eliminate the need for transistors.

Other advantages and features of the invention will become apparent from the following description and from the claims.

DESCRIPTION

Any thin film, medium, or substrate (which can be considered a thick film) can be defined in terms of a characteristic optical admittance. By considering only the reflectance, the operation of a thin film can be studied by treating it as an admittance transformer. That is, a thin film or combination of thin films (the transformer) can alter the characteristic admittance of another thin film or substrate (the transformed film) upon which it is deposited. In this fashion a normally reflective film or substrate may have its characteristic admittance altered (i.e. transformed) in such a way that its reflectivity is enhanced and/or degraded by the deposition of, or contact with, a transformer. In general there is always reflection at the interface between any combination of films, mediums, or substrates. The closer the admittances of the two, the lower the reflectance at the interface, to the point where the reflectance is zero when the admittances are matched.

Figure 1:
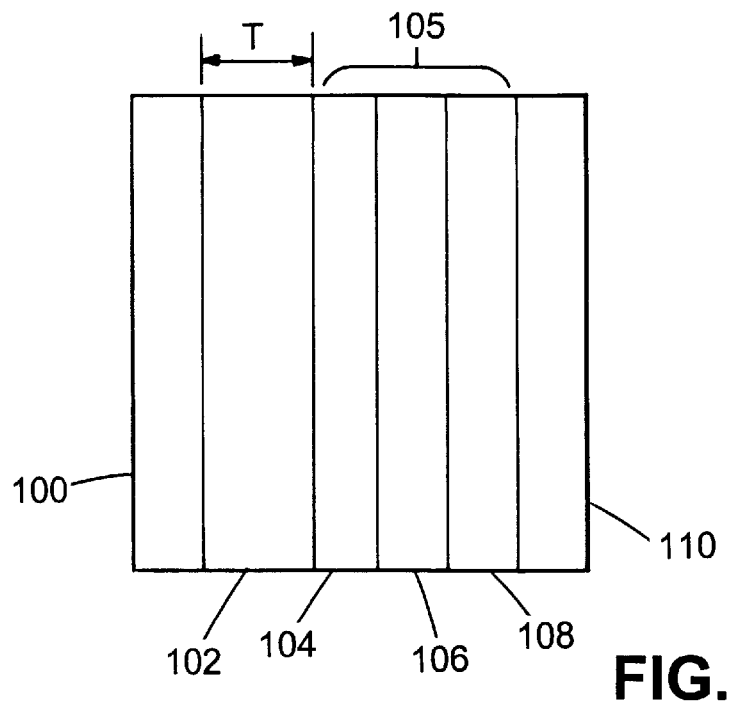
FIG. 1 is a diagram of layers a modulator.

Referring to FIG. 1, reflector 100 (the transformed film) is separated from induced absorber 105 (the transformer), comprising films 104, 106, and 108, by variable thickness spacer 102. Incident medium 110 bounds the other side of induced absorber 105. Each of these thin films is micromachined in a fashion described in the parent patent application. Induced absorber 105 performs two functions. The first is to match the admittances of reflector 100 and incident medium 110. This is accomplished via matching layer 108, which is used to transform the admittance of absorber 106 to that of the incident medium 110, and via matching layer 104, which is used to transform the admittance of reflector 100 to that of absorber 106. The second function is the absorption of light. This is accomplished using absorber 106, which performs the function of attenuating light which is incident upon it through the medium, as well as light which is incident upon it from the reflector.

Figure 2:
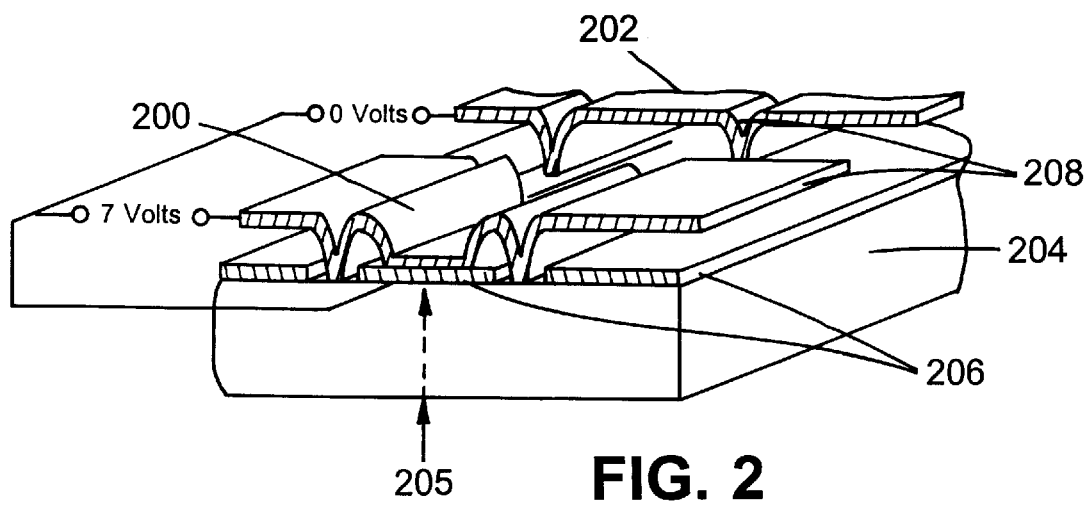
FIG. 2 is a perspective view of cavities in a device.

The ability to alter the thickness T of spacer 102 allows the optical characteristics of the entire structure to be modified. Referring to FIG. 2, pixel 200 is shown in the driven state and pixel 202 in the undriven state. In this case induced absorber 206 (the transformer) resides on substrate 204 and reflector 208 (the transformed film) is a self-supporting structure. Application of a voltage causes reflector 208 to come into contact or close proximity with induced absorber 206. Proper selection of materials and thicknesses will result in a complete transformation of the admittance of reflector 208 to that of substrate 204. Consequently, a range of frequencies of light 205, which is incident through substrate 204, will be significantly absorbed by the pixel. With no voltage applied, reflector 208 returns to its normal structural state which changes the relative admittances of the reflector and the substrate. In this state (pixel 202) the cavity behaves more like a resonant reflector, strongly reflecting certain frequencies while strongly absorbing others.

Figure 3:
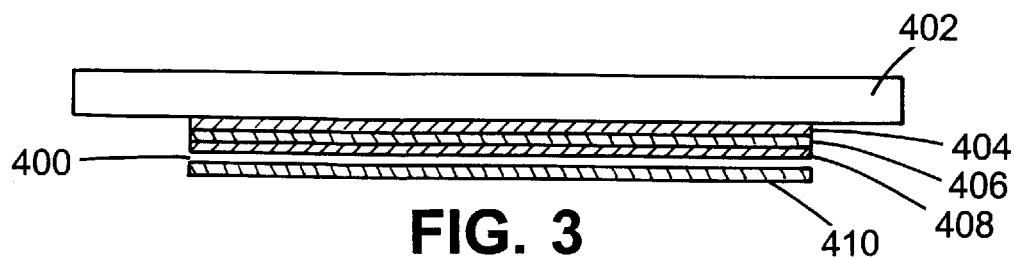
FIG. 3 is a diagram is a side view of a pixel device.
Figure 4:
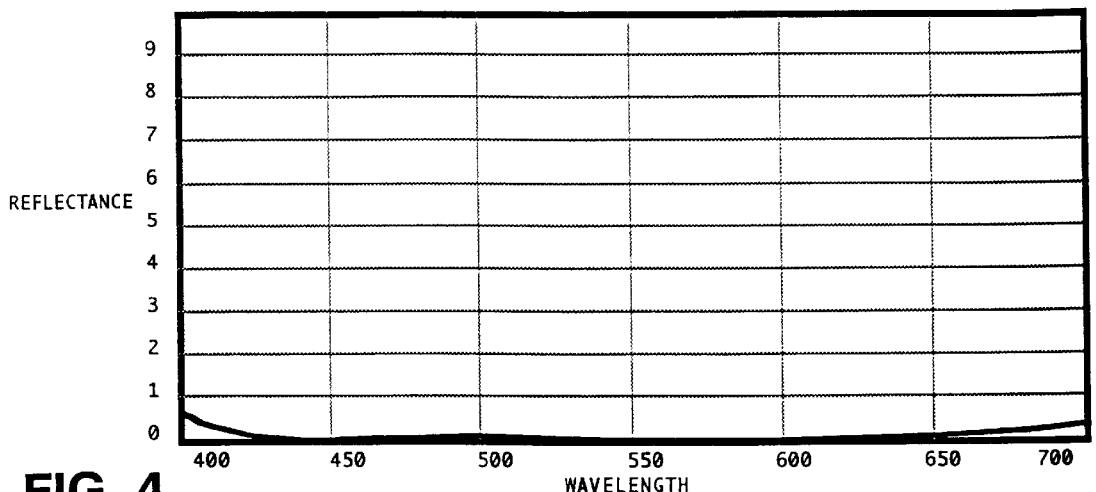
FIG. 4 is a graph of the optical response for a cavity which appears black.
Figure 5:
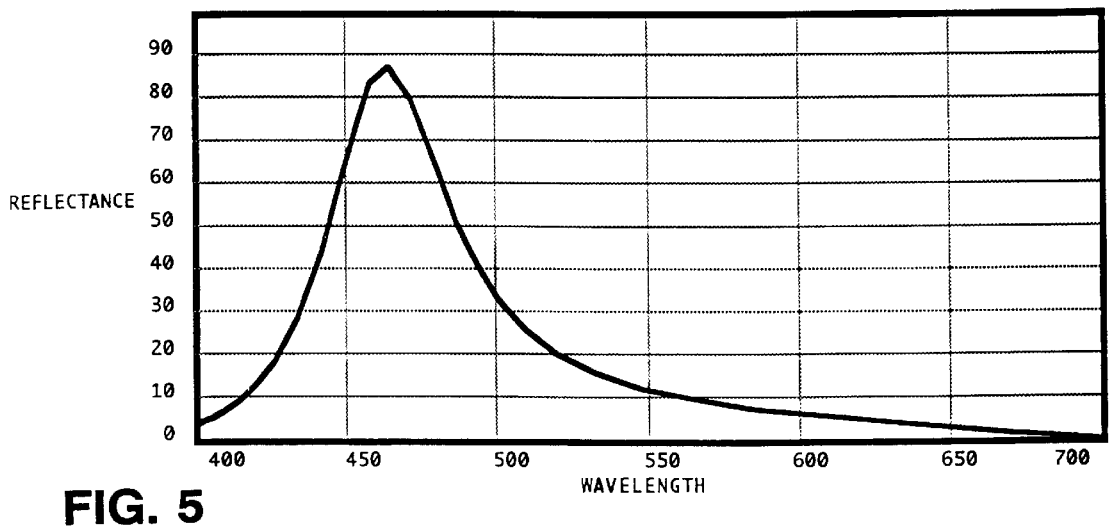
FIG. 5 is a graph of the optical response for a cavity which appears blue.
Figure 6:
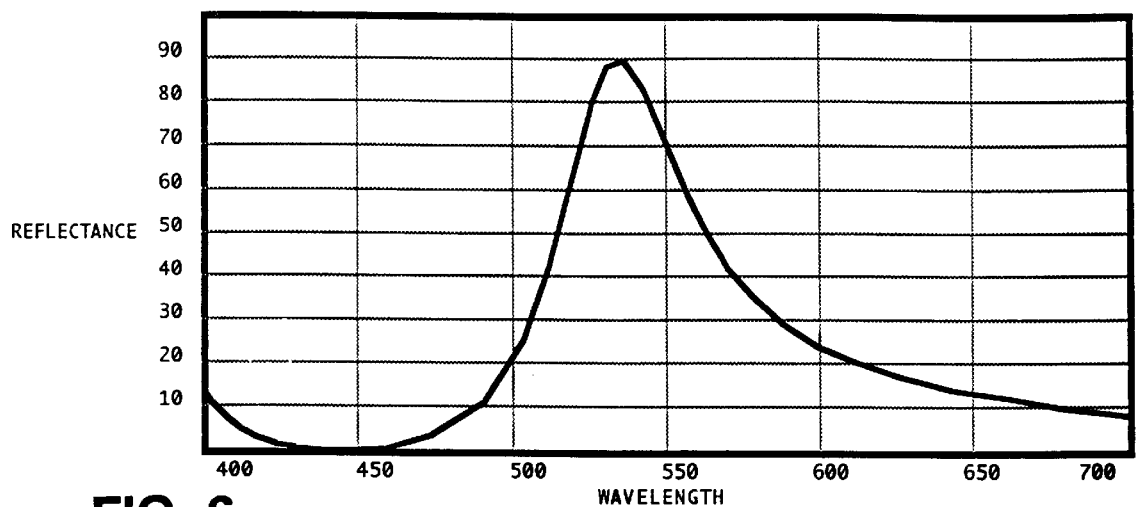
FIG. 6 is a graph of the optical response for a cavity which appears green.
Figure 7:
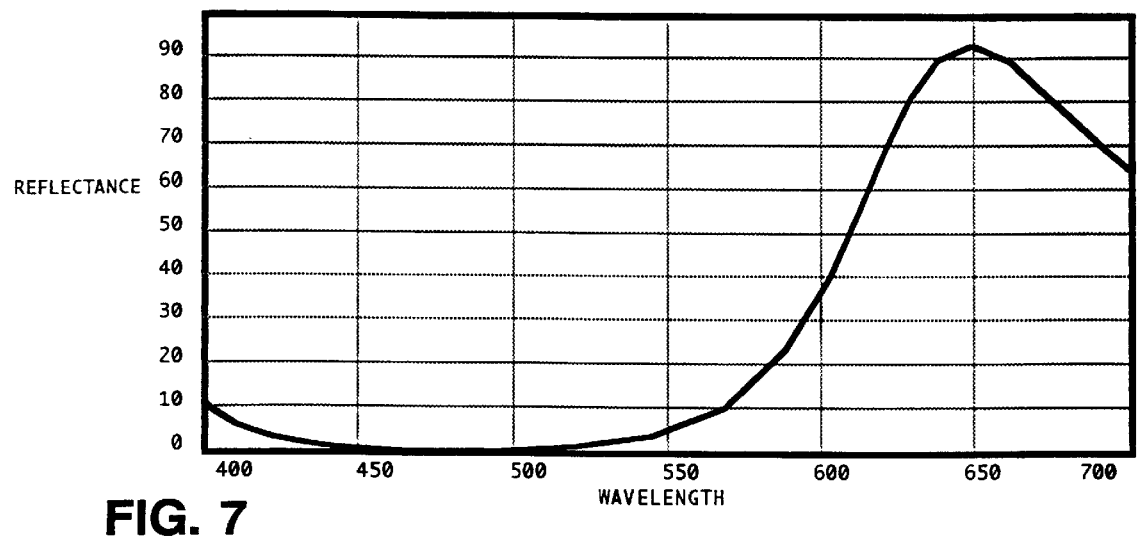
FIG. 7 is a graph of the optical response for a cavity which appears red.
Figure 8:
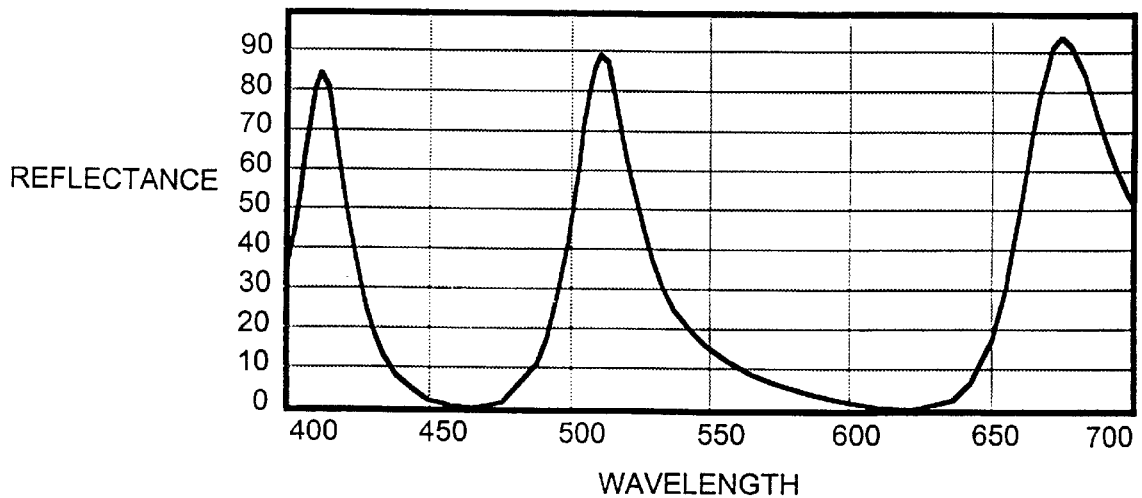
FIG. 8 is a graph of the optical response for a cavity which appears white.
Figure 9:
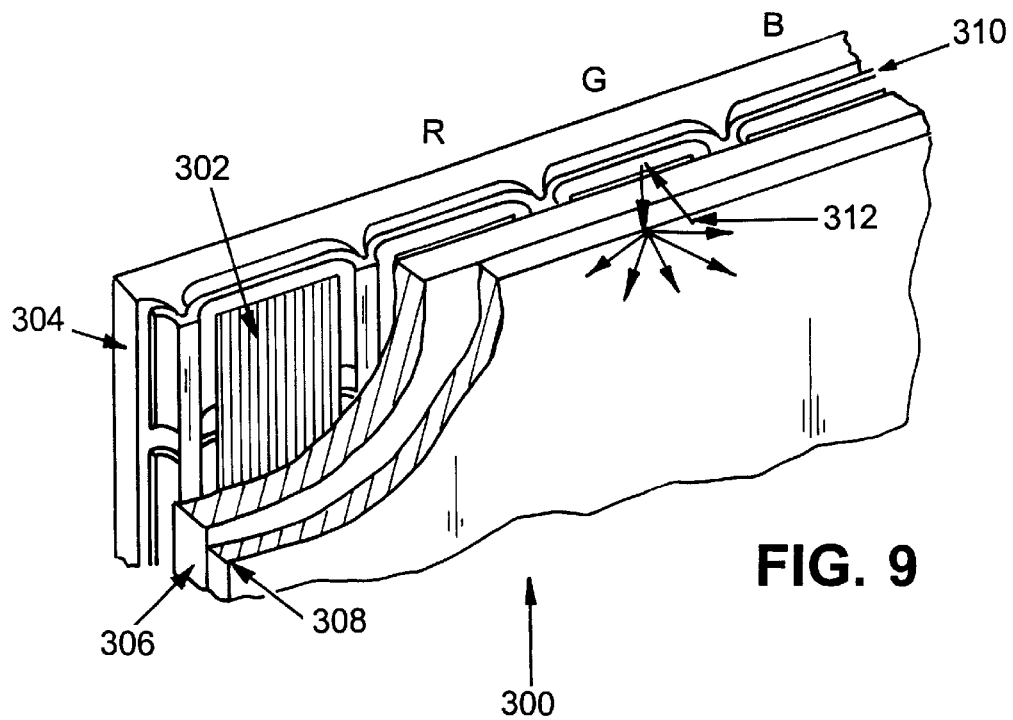
FIG. 9 is a perspective view of a fragment of a reflective flat panel display.

Proper selection of materials thus allows for the fabrication of pixels which can switch from reflecting any color (or combination of colors) to absorbing (e.g., blue to black), or from reflecting any color combination to any other color (e.g., white to red). Referring to FIG. 3, in a specific pixel design, substrate 402 is glass, matching layer 404 is a film of zirconium dioxide which is 54.46 nm thick, absorber 406 is a tungsten film 14.49 nm thick, matching layer 408 is a film of silicon dioxide 50 nm thick, spacer 400 is air, and reflector 410 is a film of silver at least 50 nm thick. Referring to FIG. 4, the optical response of the pixel is shown in the driven state, i.e., when reflector 410 is in contact with matching layer 408 resulting in a broad state of induced absorption. Referring to FIGS. 5–8, the different color pixels are shown in respective undriven states which correspond to the reflection of blue, green, red, and white light, respectively. These responses correspond to undriven spacer thicknesses of 325, 435, 230, and 700 nm respectively Referring to FIG. 9, a section of a full color reflective flat panel display 298 includes three kinds of pixels, R, G, and B. Each kind differs from the others only in the size of the undriven spacer which is determined during manufacture as described in the parent patent application. Induced absorber 300 resides on substrate 304, and reflector 308 is self-supporting. Monolithic backplate 302 provides a hermetic seal and can consist a thick organic or inorganic film. Alternatively, the backplate may consist of a separate piece, such as glass, which has been aligned and bonded to the substrate. Electrodes may reside on this backplate so that the electromechanical performance of the pixels may be modified. Incident light 310 is transmitted through optical compensation mechanism 306 and substrate 304 where it is selectively reflected or absorbed by a pixel. The display may be controlled and driven by circuitry of the kind described in the parent application.

Optical compensation mechanism 306 serves two functions in this display . The first is that of mitigating or eliminating the shift in reflected color with respect to the angle of incidence. This is a characteristic of all interference films and can be compensated for by using films with specifically tailored refractive indices or holographic properties, as well as films containing micro-optics; other ways may also be possible. The second function is to supply a supplemental frontlighting source. In this way, additional light can be added to the front of the display when ambient lighting conditions have significantly diminished thus allowing the display to perform in conditions ranging from intense brightness to total darkness. Such a frontlight could be fabricated using patterned organic emitters or edge lighting source coupled to a micro-optic array within the optical compensation film; other ways may also be possible.

The general process for fabrication of the devices is set forth in the parent application. Additional details of two alternative ways to fabricate spacers with different sizes are as follows; other ways may also be possible.

Both alternative processes involve the iterative deposition and patterning of a sacrificial spacer material which, in the final step of the larger process is, etched away to form an air-gap.

Figure 10A:
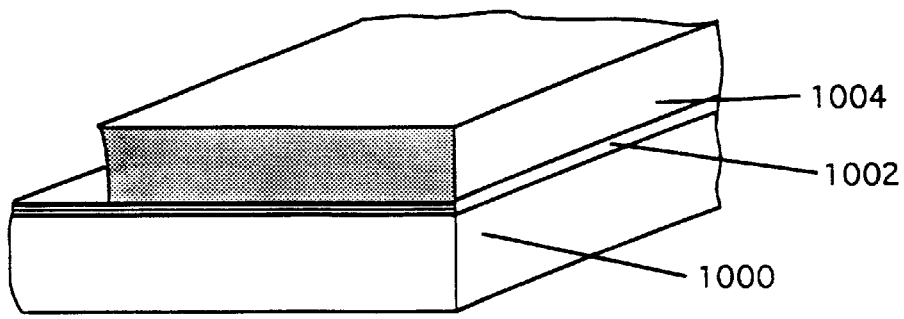
FIGS. 10a, 10b, 10c, 10d are perspective views of different spacers during fabrication.
Figure 10B:
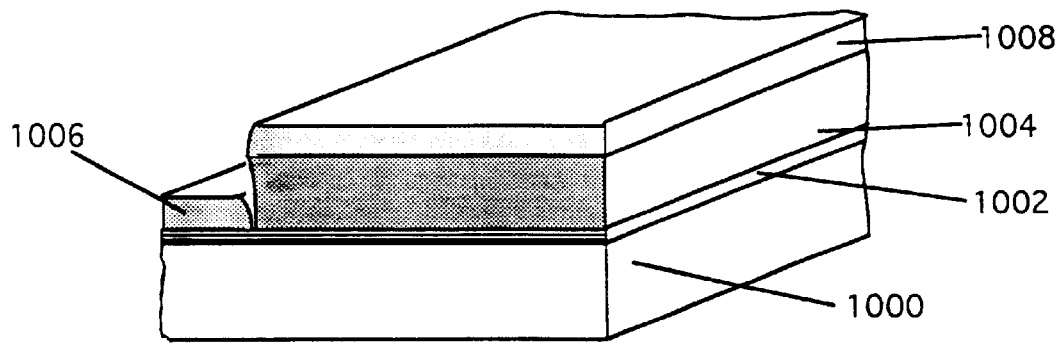
Figure 10C:
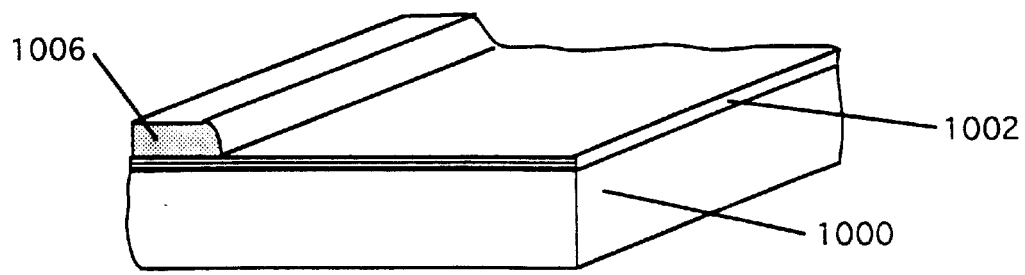
Figure 10D:
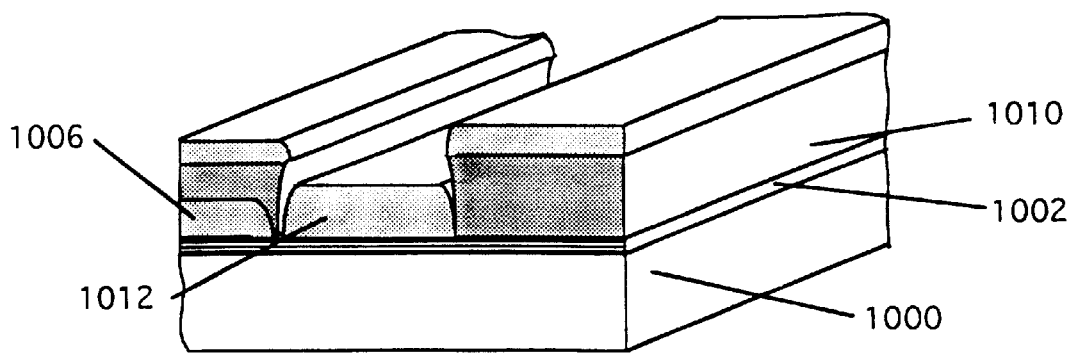

Referring to FIG. 10a, substrate 1000 is shown with induced absorber 1002 already deposited and photoresist 1004 deposited and patterned. Induced absorber 1002 is deposited using any number of techniques for thin film deposition including sputtering and e-beam deposition. The photoresist is deposited via spinning, and patterned by overexposure to produce a natural overhang resulting in a stencil. The result is that it may be used to pattern subsequently deposited materials using a procedure known as lift-off. Referring to FIG. 10b, spacer material 1006 has been deposited, resulting in excess spacer material 1008 on top of the stencil. Referring to FIG. 10c, the stencil along with the excess spacer material have been lifted off by immersing the device in a bath of a solvent such as acetone and agitating it with ultrasound. Referring to FIG. 10d, the process has begun again with new photoresist 1010 having been deposited patterned in a fashion such that new spacer 1012 is deposited adjacent to the old spacer 1006. Repeating the process once more results in spacers with three different thicknesses. Referring to FIG. 10d, the process has begun again with new photoresist 1010 having been deposited patterned in a fashion such that new spacer 1012, with a different thickness, is deposited adjacent to the old spacer 1006.

Figure 11A:
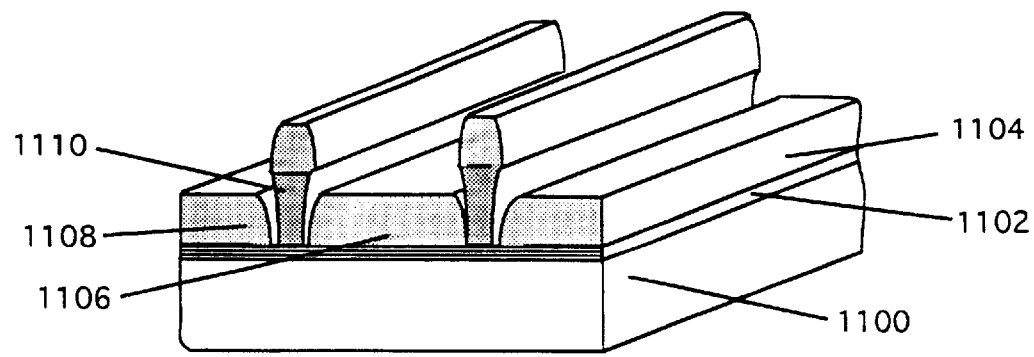
FIGS. 11a, 11b, 11c, 11d are also perspective views of different spacers during fabrication.
Figure 11B:
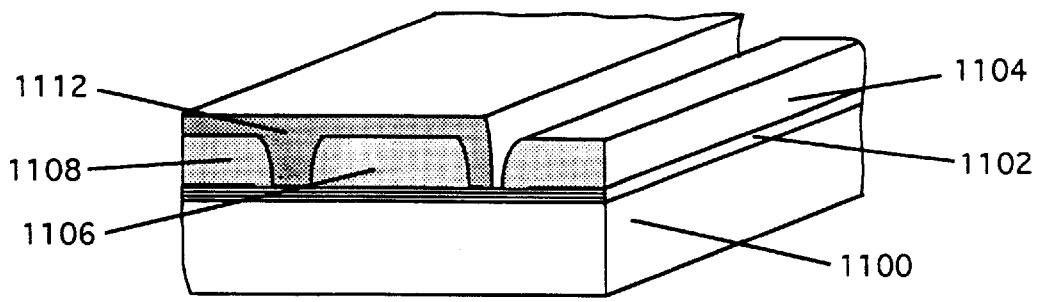
Figure 11C:
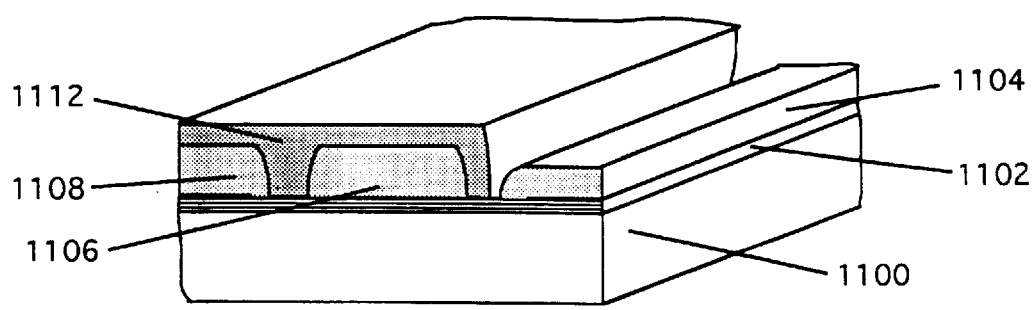
Figure 11D:
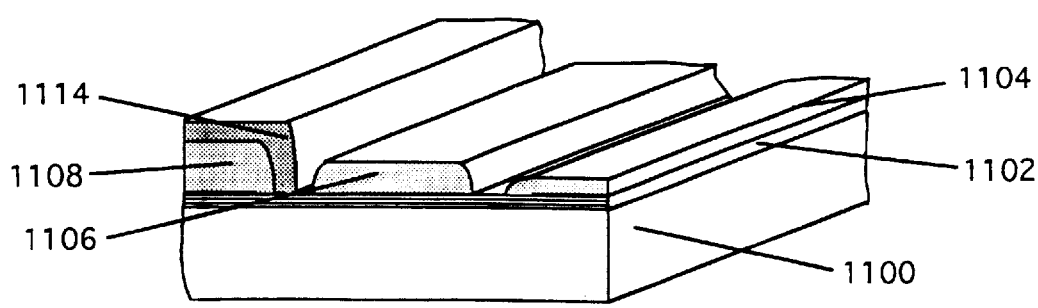

Referring to FIG. 11a, substrate 1000 is shown with induced absorber 1102 already deposited. Spacer materials 1104, 1106, and 1108 have also been deposited and patterned by virtue of lift-off stencil 1110. The spacer materials have a thickness corresponding to the maximum of the three thicknesses required for the pixels. Referring to FIG. 11b, the stencil along with the excess material has been lifted off and new photoresist 1112 has been deposited and patterned such that spacer 1104 has been left exposed. Referring to FIG. 11c, spacer material 1104 has been etched back via one of a number of techniques which include wet chemical etching, and reactive ion etching. Only a portion of the required spacer material is etched away, with the remainder to be etched in a subsequent etch step. Photoresist 1112 is subsequently removed using a similar technique. Referring to FIG. 11d, new photoresist 1114 has been deposited and patterned exposing spacers 1104 and 1106. The entire etch of spacer 1106 is performed in this step, and the etch of spacer 1104 is completed. Photoresist 1114 is subsequently removed and the process is complete.

Other embodiments are within the scope of the following claims.

For example, the spacer material need not ultimately be etched away but may remain instead a part of the finished device. In this fashion, and using the previously described patterning techniques, arbitrary patterns may be fabricated instead of arrays of simple pixels. Full color static graphical images may thus be rendered in a method which is analogous to a conventional printing process. In conventional printing, an image is broken up into color separations which are basically monochrome graphical subsets of the image, which correspond to the different colors represented, i.e., a red separation, a blue separation, a green separation, and a black separation. The full-color image is produced by printing each separation using a different colored ink on the same area.

Alternatively, in a process which we will call "Iridescent Printing", the different separations are composed of layers of thin films which correspond to the IMod design described here and those in the referenced patent. Patterning or printing a combination of colors or separations on the same area, allows for brilliant full-color images to be produced.

Figure 12A:
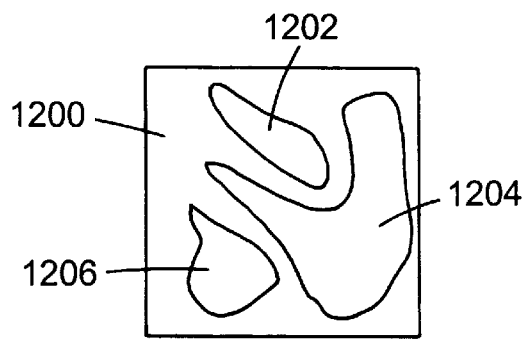
FIGS. 12a, 12b, 12c, 12d are top views of a static graphic image.
Figure 12B:
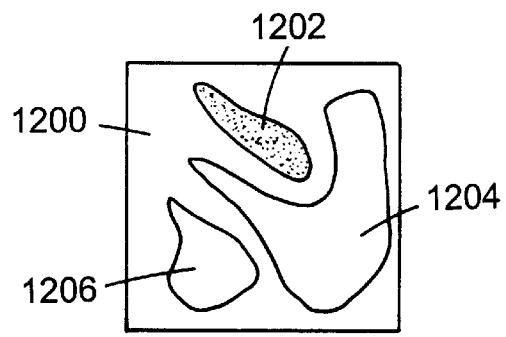
Figure 12C:
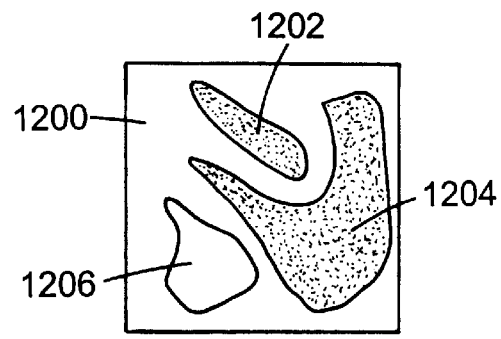
Figure 12D:
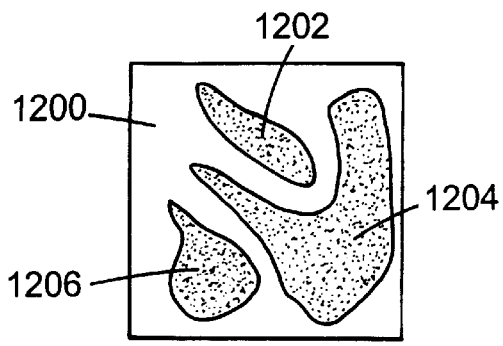

Referring to FIG. 12a, a square substrate is shown with area 1200 representing the portion of the substrate which has been patterned with a thin film stack optimized for black. Referring to FIG. 12b, the substrate has been subsequently patterned with a thin film stack optimized for red in area 1202. Referring to FIG. 12c, the substrate has been subsequently patterned with a thin film stack optimized for green in area 1204. Referring to FIG. 12d, the substrate has been subsequently patterned with a thin film stack optimized for blue in area 1206.

Alternatively, a simpler process can be obtained if only the induced absorber design is used. In this process, the entire substrate is first coated with the induced absorber stack. Subsequent steps are then used to pattern the spacer material only, using the aforementioned techniques. After the desired spacers, i.e., colors are defined, a final deposition of a reflector is performed.

The brightness of different colors can be altered by varying the amount of black interspersed with the particular color i.e. spatial dithering. The images also exhibit the pleasing shift of color with respect to viewing angle known as iridescence.

In another example, a reflective flat panel display may also be fabricated using a single kind of pixel instead of three. Multiple colors, in this case, are obtained through fabricating the pixels in the form of continuously tunable or analog interferometric modulators as described in the parent patent application. In this fashion, any individual pixel may, by the application of the appropriate voltage, be tuned to reflect any specific color. This would require that the array be fabricated on a substrate along with electronic circuitry, or directly on the surface of an integrated circuit, in order to provide a charge storage mechanism. This approach, though it requires a more complicated driving scheme relying on analog voltages, provides superior resolution. It would also find application in a projection system.

What is claimed is:

1. A direct view reflective flat panel display comprising an array of interferometric modulators, each of said modulators comprising a reflector surface, and a transmissive induced absorber that attenuates light incident upon it interposed between the reflective surface and a medium from which radiation is incident on the display, the induced absorber having radiation admittance characteristics that match the admittance of the reflector surface to the admittance of the incident medium.

2. The display of claim 1 wherein the array comprises a set of analog interferometric modulators arranged to be tuned to a specific reflective state.

3. The display of claim 1 wherein the array comprises sets of the interferometric modulators the respective sets being arranged to switch between different pairs of reflective states.

4. The display of claim 1 wherein the brightness of each of the modulators is controlled by pulse width modulation.

5. The display of claim 1 wherein the brightness of each of the modulators is controlled by spatial dithering.

6. The display of claim 1 wherein the brightness of each of the modulators is controlled by a combination of pulse width modulation and spatial dithering.

7. The display of claim 1 wherein the array is sealed by a backplane.

8. The display of claim 7 where the backplane comprises a monolithic element.

9. The display of claim 7 wherein the backplane is attached.

10. The display of claim 7 wherein the backplane supports electrodes which modify the electromechanical response of the pixels.

11. The display of claim 1 where each of the modulators is actuated by electrostatic forces.

12. The display of claim 1 wherein an optical compensation mechanism is used to mitigate or eliminate a shift in color with respect to viewing angle.

13. The display of claim 1 wherein an optical compensation mechanism is used to provide supplemental frontlighting.

14. The display of claim 1 wherein an optical compensation mechanism is used to mitigate or eliminate a shift in color with respect to viewing angle, and to provide supplemental frontlighting.

15. The display of claim 1 wherein the array is fabricated on the substrate along with electronic circuitry.

16. A full-color static graphical image comprising
an array of interferometric modulator cavities, each cavity including
a reflector, and
an induced absorber, the induced absorber including a spacer having a fixed thickness that defines a color associated with the cavity, the fixed thicknesses being different for respective ones of the cavities in accordance with the static graphical image.

17. The image of claim 16 in which the brightness of different cavities is determined by spatial dithering.

18. A full-color static graphical image comprising patterns of image elements, the elements of each of the patterns comprising interferometric cavities sharing a common fixed cavity thickness that defines a color associated with the pattern, the patterns together producing the image.

19. The image of claim 18 in which the brightness of the different patterns is determined by spatial dithering.

20. The image of claim 18 wherein the image elements are formed on a substrate.

21. The image of claim 18 wherein the color of one of the patterns is black.

22. The image of claim 18 wherein the color perceived by a viewer of the image varies with angle of viewing.

* * * * *

UNITED STATES PATENT AND TRADEMARK OFFICE
CERTIFICATE OF CORRECTION

PATENT NO.    : 6,055,090                                        Page 1 of 1
DATED         : April 25, 2000
INVENTOR(S)   : Mark W. Miles It is certified that error appears in the above-identified patent and that said Letters Patent is hereby corrected as shown below:

Title page,
Item [60], Related U.S. Application Data, please delete the following:
"Continuation of application No. 08/688,710, Jul. 31, 1996, which is a division of application No. 08/554,630, Nov. 6, 1995, abandoned, which is a continuation-in-part of application No. 08/238,750, May 5, 1994, Pat. No. 5,835,255, which is a continuation-in-part of application No. 08/032,711, Mar. 17, 1993, abandoned, which is a continuation of application No. 07/794,819, Nov. 18, 1991, abandoned, which is a continuation of application No. 07/489,794, Mar. 5, 1990, abandoned, which is a continuation of application No. 07/296,896, Jan. 12, 1989, abandoned, which is a continuation of application No. 07/166,774, Mar. 4, 1988, abandoned, which is a continuation of application No. 06/855,116, Apr. 23, 1986, abandoned."
And insert the following:
-- This is a continuation of U.S. patent application Ser. No. 08/688,710, filed Jul. 31, 1996 (now U.S. Pat. No. 6,040,937), which is a divisional of U.S. patent application Ser. No. 08/554,630, filed Nov. 6, 1995 (now abandoned), which is a continuation-in-part of U.S. patent application Ser. No. 08/238,750, filed May 5, 1994 (now U.S. Pat. No. 5,835,255). --

Signed and Sealed this

Third Day of May, 2005

JON W. DUDAS
*Director of the United States Patent and Trademark Office*